May 20, 1924. 1,494,813
C. SCHENCK ET AL
METHOD OF MAKING METAL WHEELS
Original Filed Jan. 17, 1921
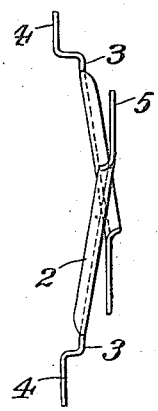
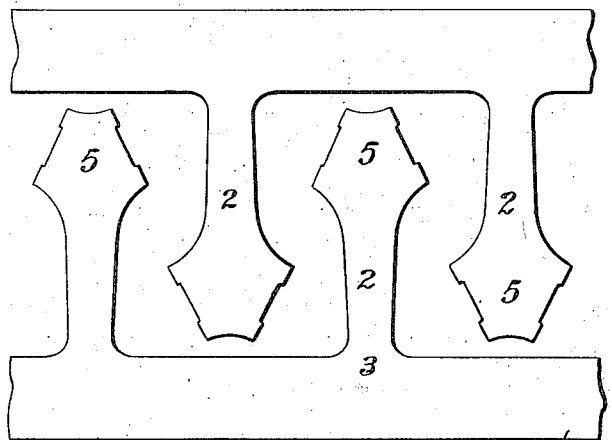
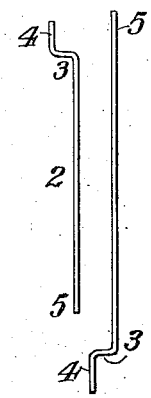
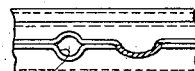
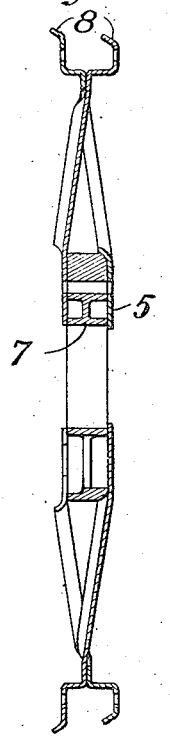
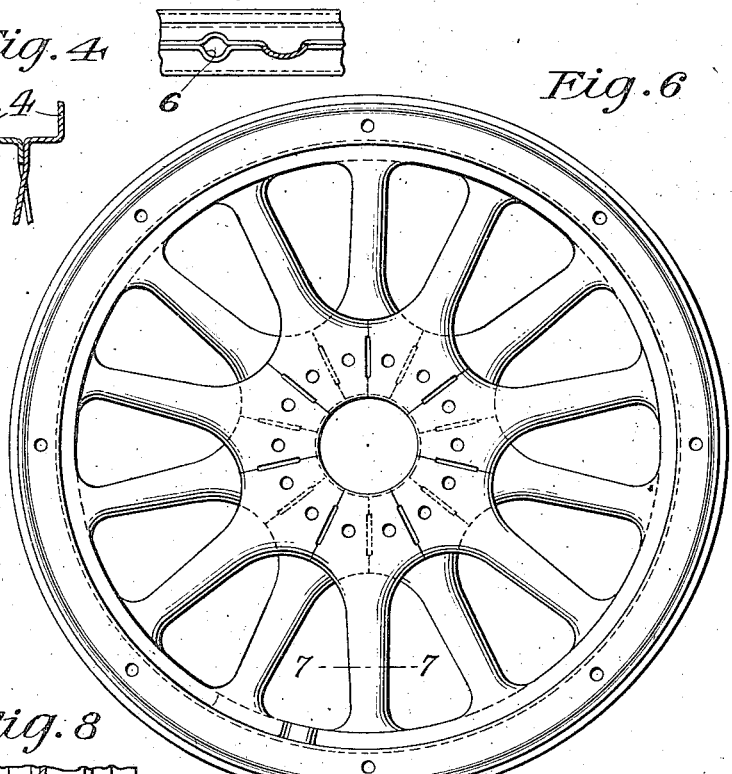
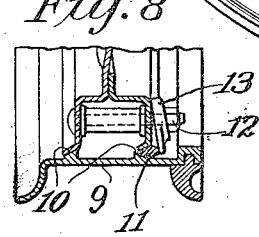
Inventors
Charles Schenck,
Lewis Fine, and
Emil Ibach
By their Attorney
Clarence D Kerr Patented May 20, 1924.

1,494,813

UNITED STATES PATENT OFFICE.

CHARLES SCHENCK, LEWIS FINE, AND EMIL IBACH, OF BETHLEHEM, PENNSYLVANIA, ASSIGNORS TO BETHLEHEM STEEL COMPANY, OF BETHLEHEM, PENNSYLVANIA, A CORPORATION OF PENNSYLVANIA.

METHOD OF MAKING METAL WHEELS.

Application filed January 17, 1921, Serial No. 437,643. Renewed October 23, 1923.

*To all whom it may concern:*

Be it known that we, CHARLES SCHENCK and LEWIS FINE, citizens of the United States, and EMIL IBACH, a citizen of the Republic of Germany, all residing at Bethlehem, Northampton County, Pennsylvania, have jointly invented new and useful Improvements in Methods of Making Metal Wheels, of which the following is a specification, reference being had to the accompanying drawings, in which—

Fig. 1 is a plan showing a metal sheet which has been cut into two portions with projections in the form of spokes attached thereto; Fig. 2 shows in side elevation the two blanks with corresponding ends stamped to form portions of the felloe or rim seat of the completed wheel; Fig. 3 shows in side elevation the two blanks with grooved or arched intermediate spoke portions, and with the spokes bent out of the plane of the wheel web; Fig. 4 is a section showing the felloe ends of the two blanks after being secured together; Fig. 5 is a section of the wheel with the ends of the felloe bent to form inclined seats for the rim and after the blanks have been bent into wheel form with the spoke spacing member in position; Fig. 6 is a plan of the wheel shown in Fig. 5; Fig. 7 is a section of an intermediate portion of a spoke; and Fig. 8 is a section of the wheel with the rim in position.

Our invention relates to metal wheels of the staggered spoke type, and comprises a wheel in which the spokes, rim seat, and the connecting web are preferably formed of two pieces of metal. A set of spokes on one side of the wheel is attached to the section of the felloe on the opposite side of the wheel, and vice versa, so that the spokes are not only staggered but are crossed adjacent to the felloe. Our invention also consists in the various features which we shall hereinafter describe and claim.

Referring to the drawings, in Fig. 1 we have indicated a length or strip of sheet metal which has been cut or stamped into two sections, thus forming the spoke portions 2 attached to the web 3 and felloe portion 4. In Fig. 2 is shown the first bending operation of the felloe 4, in which two right angle bends are made in each section along their entire length, while the free ends 5 of the spokes, which later form the bearing on the hub, are left straight. In Fig. 3 is shown a further operation on the blanks, in which the intermediate sections of the spokes 2 are arched into semi-round form for stiffening. This arched portion extends from the web 3 to where the intermediate portion merges into the keystone shaped end 5.

The next bending operation, also shown in Fig. 3, is to splay the spokes with reference to the web 3 connecting them to the felloe portion 4. This is accomplished by bending all the spokes of one section in the same direction, while the spokes of the other section are all bent in the opposite direction, the bending of each section being such that when the two sections are assembled together the spokes will be alternately staggered to the same degree. To afford the necessary opening in the felloe for the valve stem of the tire each section has a small half rounded indentation 6 in the web and felloe, so that when the two sections are joined together an opening for the valve stem is provided.

By the next operation, as is shown in Fig. 4, the webs 3 of the two sections are joined together by any suitable means, such as continuous or spot welding, or by rivets or by bolts, a spoke of one section being arranged midway between, or in staggered relation to, the adjacent spokes of the other section.

The wheel structure, which has been formed from the two permanently joined sections, is then bent into circular shape. This forming operation may be carried out as described in our pending application Serial No. 389,754, filed June 17, 1920. By this bending operation the spoke spacing member 7 is enclosed within and between the spoke ends 5 at the wheel hub as the operation of forming the wheel structure is carried on and the spokes assume a radial position. The ends of the felloes are also brought together and butt welded.

In forming the wheel to circular shape it is made slightly larger in diameter than the finished wheel, and after the ends of the wheel have been welded together it may be compressed to the exact size desired by means of a hydraulic tire setting machine. As the metal is cold in this compressing operation, additional strength is given to the metal in the felloe and web. As the felloe is compressed the spokes move inwardly to their final radial positions, and, if desired, the keystone spoke ends may then be welded together along the sides where they are in contact, thereby giving two continuous plate hub portions.

The felloe ends, which have been left straight and which are to form the tapered seats 8 for the rim 9, are now bent over and formed, as is shown in Fig. 5. Stiffener or felloe spacers, as is shown in Fig. 8, may be employed, a suitable number being inserted in the felloe at properly spaced intervals.

The rim, which has on its under side inclined faces 10 complementary to the tapered seats 8 on the felloe, is held in place by the wedge ring 11 and by the usual bolts 12 and wedge clips 13.

We have found that wheels formed in the manner just described have many advantages. They are substantially as light in weight as a wooden wheel of corresponding size with its iron felloe. The staggered and bent cross spokes are particularly well adapted to take care of side strain and skidding, since when the felloe is pressed inward toward the body of the car the outer row of spokes is in tension and causes the web joining the spokes to press against the web of the other section, and a large part of this strain is taken up by the two surfaces of the web pressing against each other, which tends to relieve the strain on the spot welding and bolts. A pressure in the opposite direction is taken up in a corresponding manner.

As the felloe and spokes of each section are integral, there are no crevices or cracks in which mud or water may gather. The valve hole location is readily accessible and the valve stem is guarded and supported by the web under the felloe. As the web is continuous it acts to stiffen and reinforce the outer part of the wheel and serves to resist blows due to direct impact and distribute such blows more equally to the spokes than if each spoke was joined directly to the rim.

Wheels constructed in accordance with our invention afford a maximum resistance to torsional stresses, by reason of the arrangement of the crossed and staggered spokes; by reason of the keystone shaped ends of the spoke, which give the effect of a continuous metal plate, particularly when welded together at the hub, and by reason of the stiffening of the mid sections of the spokes by reason of their arched shape.

Our invention is applicable not only to passenger cars, but also to vehicles of all sorts.

The terms and expressions which we have employed are used as terms of description and not of limitation, and we have no intention, in the use of such terms and expressions, of excluding any equivalents of the features shown and described, or portions thereof, but recognize that various modifications are possible within the scope of the invention claimed.

What we claim is:

1. The method of making metal wheels which comprises taking a sheet, cutting it to form a continuous strip with projections therefrom in the form of spokes, bending the uncut edge of the sheet into the form of a felloe and the spokes at an angle to the plane of the original sheet, forming a second sheet in the manner in which the first section was formed, securing together by a permanent bond portions of the sections intermediate the felloe and spoke portions, and then bending the resulting structure into wheel form with the spokes arranged about a spoke spacing member.

2. The method of making metal wheels which comprises forming a wheel from a sheet of metal by taking the sheet, cutting it into two complementary sections with projections in the form of spokes, forming a felloe portion on the edge of each such section opposite the spokes, bending the spokes on each such section at an angle to the plane of the original sheet and in a direction away from that in which the felloe portion has been formed thereon, then securing together intermediate parts of the sections by a permanent bond, whereby a spoke portion of one section lies at the opposite side of the wheel from the felloe portion of the same section, then bending the resulting structure into wheel form with the spoke ends of the two sections arranged in substantially parallel planes.

3. The method of making metal wheels which comprises taking two similarly formed sections, each having spoke, web and felloe portions, permanently attaching the two web portions together with the felloe portion on one section complementing the felloe portion on the other section to form a rim seat, and the spokes of one section intercalated through the spokes of the other section, and bending the resulting structure about a spoke spacing member into wheel form.

4. The method of making metal wheels which comprises forming a wheel from sheet steel, which comprises cutting a sheet to form a continuous strip with projections therefrom in the form of spokes, bending the uncut edge of the sheet into the form of a felloe and the spokes at an angle to the plane of the original sheet, forming a second sheet in the manner in which the first section was formed, subsequently bending the resulting structure into wheel form with the spokes arranged about a spoke spacing member, the portions of the sections intermediate the felloe and spoke portions being secured together by a permanent bond.

5. The method of making metal wheels which comprises forming a wheel from sheet metal, which comprises cutting sheet metal into two complementary sections with projections in the form of spokes, forming a felloe portion on the edge of each such section opposite the spokes, bending the spokes on each such section at an angle to the plane of the original sheet and in a direction away from that in which the felloe portion has been formed thereon, subsequently bending the sections into wheel form with the spoke ends of the sections arranged in substantially parallel planes, the intermediate parts of the sections being secured together by a permanent bond.

CHARLES SCHENCK.
LEWIS FINE.
EMIL IBACH.